(12) United States Patent
Ren et al.

(10) Patent No.: US 8,709,963 B2
(45) Date of Patent: Apr. 29, 2014

(54) MOLECULAR SIEVE

(75) Inventors: Hongqiang Ren, Nanjing (CN); Tao Zhang, Nanjing (CN); Lili Ding, Nanjing (CN)

(73) Assignee: Nanjing University, Nanjing (CN)

( * ) Notice: Subject to any disclaimer, the term of this patent is extended or adjusted under 35 U.S.C. 154(b) by 0 days.

(21) Appl. No.: 13/420,600

(22) Filed: Mar. 14, 2012

(65) Prior Publication Data

US 2012/0171447 A1    Jul. 5, 2012

Related U.S. Application Data

(63) Continuation of application No. PCT/CN2010/079878, filed on Dec. 16, 2010.

(30) Foreign Application Priority Data

Apr. 16, 2010 (CN) .......................... 2010 1 0149981

(51) Int. Cl.
*B01J 29/06* (2006.01)
*B01J 27/182* (2006.01)

(52) U.S. Cl.
USPC ............... 502/60; 502/73; 502/208; 502/214; 977/780; 977/962

(58) Field of Classification Search
USPC ............... 502/60, 73, 208, 214; 977/780, 962
See application file for complete search history.

(56) References Cited

U.S. PATENT DOCUMENTS

| | | | | |
|---|---|---|---|---|
| 4,011,276 A | * | 3/1977 | Chu | 585/471 |
| 4,088,706 A | * | 5/1978 | Kaeding | 585/408 |
| 5,145,816 A | * | 9/1992 | Beck et al. | 502/60 |
| 6,211,104 B1 | * | 4/2001 | Shi et al. | 502/67 |
| 2007/0010699 A1 | * | 1/2007 | Choi et al. | 585/652 |

FOREIGN PATENT DOCUMENTS

WO    2009/092871    *    7/2009

* cited by examiner

*Primary Examiner* — Elizabeth Wood
(74) *Attorney, Agent, or Firm* — Matthias Scholl P.C.; Matthias Scholl

(57) ABSTRACT

A molecular sieve including a basic skeleton of a molecular sieve and magnesium and phosphorus compounds as functional materials supported on the inner surface of the basic skeleton. A method of preparation of a modified molecular sieve including (1) dissolving a magnesium salt in water to obtain a magnesium salt solution; (2) dissolving phosphoric acid in water to obtain a phosphoric acid solution; (3) adding a molecular sieve to the magnesium salt solution, stirring, standing, drying for dehydration, and baking; and (4) adding a modified molecular sieve with supported magnesium compounds obtained from the step (3) to the phosphoric acid solution, stirring, standing, drying for dehydration, and baking to obtain a modified molecular sieve. The modified molecular sieve has high selectivity for ammonia nitrogen in wastewater.

8 Claims, No Drawings

MOLECULAR SIEVE

CROSS-REFERENCE TO RELATED APPLICATIONS

This application is a continuation of International Patent Application No. PCT/CN2010/079878 with an international filing date of Dec. 16, 2010, designating the United States, now abandoned as to the United States, and further claims priority benefits to Chinese Patent Application No. 201010149981.8 filed Apr. 16, 2010. The contents of all of the aforementioned applications, including any intervening amendments thereto, are incorporated herein by reference.

BACKGROUND OF THE INVENTION

1. Field of the Invention

The invention relates to a modified molecular sieve for wastewater treatment and a preparation method thereof, and more particularly to a modified molecular sieve with high selectivity to ammonia nitrogen in wastewater and a preparation method thereof.

2. Description of the Related Art

There are various methods in the prior art to remove ammonia nitrogen in wastewater such as biotechnology, air stripping, membrane absorption, and precipitation of magnesium ammonium phosphate (MAP). For now, the precipitation of magnesium ammonium phosphate is the hottest technology in international and domestic studies on ammonia-nitrogen wastewater treatment, where magnesium salt and phosphate are added to the wastewater to cause chemical reaction with the ammonia nitrogen. Afterwards, the magnesium ammonium phosphate precipitation ($MgNH_4PO_4 \cdot 6H_2O$) is generated and thus the ammonia nitrogen is removed.

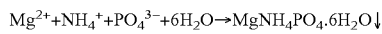

$$Mg^{2+}+NH_4^++PO_4^{3-}+6H_2O \rightarrow MgNH_4PO_4 \cdot 6H_2O\downarrow$$

The foregoing method is simple and easy to operate, but in actual applications, as the wastewater quality and amount fluctuate dramatically, it will affect the addition of the fixed amount of the magnesium salt and phosphate. In other words, if they are added more than the amount of the ammonia nitrogen in wastewater, the chemical substances will be wasted; if they are added less than the amount of the ammonia nitrogen in wastewater, the ammonia-nitrogen wastewater treatment effect will be affected. Consequently, a fixed bed reactor is introduced to process the ammonia nitrogen wastewater, which can effectively solve the magnesium salt and phosphate addition problem. However, when a large amount of wastewater is processed by means of the fixed bed reactor, it will generate a large pressure drop. Therefore, such a method is difficult for practical applications. The above technical difficulty hinders the further study and applications of the MAP precipitation technology.

A molecular sieve is a cubic lattice aluminosilicate compound having a porous skeleton structure formed by silicon aluminum through oxygen bridges. The structure includes a plurality of pore canals with even diameters and empty pores which are arranged orderly and with large internal surface areas. Molecular sieves have the advantages of low fluid resistance, high adsorption rate, large adsorption capacities, strong selectivity, and high mechanical strength. However, since ammonia nitrogen cannot be removed with high selectivity purely by a single molecular sieve, thus a problem difficult to be solved nowadays is how to effectively utilize structural characteristics of molecular sieves to both maintain their advantages (e.g. low fluid resistance, stable performance, etc.) and meanwhile remove ammonia nitrogen with high selectivity. At present, studies and applications on a modified molecular sieve using magnesium compounds and phosphorus compounds to remove ammonia nitrogen in wastewater cannot be found in related documents and are not disclosed in any patent.

SUMMARY OF THE INVENTION

In view of the above-described problems, it is one objective of the invention to provide a modified molecular sieve with high selectivity to ammonia nitrogen in wastewater and a preparation method thereof, in which the modified molecular sieve with supported magnesium and phosphorus compounds that have low fluid resistance and high stability is used to remove ammonia nitrogen in wastewater. It can effectively solve the problem of the large pressure drop caused by using the fixed bed reactor in ammonia-nitrogen wastewater treatment. The modified molecular sieve can be widely applied to remove the ammonia nitrogen in wastewater with high selectivity.

To achieve the above objective, in accordance with one embodiment of the invention, there is provided a modified molecular sieve, comprising:
(1) a basic skeleton of a molecular sieve; and
(2) magnesium and phosphorus compounds as functional materials supported on the inner surface of the basic skeleton.

In a class of this embodiment, the molecular sieve forming the basic skeleton as described in (1) is a mesoporous molecular sieve with various common structures, in which the pore diameter is within 1.5-10 nm, BET specific surface area is greater than 600 $m^2/g$, relative crystalline is more than 90%, and Si/Al is greater than 1 (no specific requirements required). Preferred molecular sieve is MCM-41 or SBA-15 and a more preferred one is MCM-41.

In a class of this embodiment, the functional materials as described in (2) are magnesium and phosphorus compounds, in which the magnesium compounds are magnesium oxide, magnesium carbonate, magnesium phosphate, magnesium nitrate, or a mixture thereof; the phosphorus compounds are phosphorus pentoxide, magnesium phosphate, or a mixture thereof. The weight percentage content of magnesium in the modified molecular sieve is 5-25% and phosphorus is 5-20%.

In accordance with another embodiment of invention, there provided is a method of preparation of a modified molecular sieve comprising the following steps:
(1) Dissolving magnesium salt into water to obtain 1-5 mol/L of a magnesium salt solution;
(2) Dissolving phosphoric acid into water to obtain 1-4 mol/L of a phosphoric acid solution;
(3) Adding a molecular sieve into the magnesium salt solution prepared in the step (1), stirring for 10-30 mins, standing for 1-6 hrs, drying for dehydration, and baking for 2-6 hrs under a temperature of 300-600° C.; and
(4) Adding a modified molecular sieve with supported magnesium compounds obtained from the step (3) into the phosphoric acid solution prepared in the step (2), stirring for 10-30 mins, standing for 1-6 hrs, drying for dehydration, and baking for 2-6 hrs under a temperature of 300-600° C. to obtain a modified molecular sieve with high selectivity to ammonia nitrogen in wastewater.

In a class of this embodiment, the magnesium salt used in the step (1) is magnesium nitrate, magnesium carbonate, magnesium oxide, or a mixture thereof.

In a class of this embodiment, a temperature for drying for dehydration in the step (3) is 100-200° C. and the time is 4-8 hrs.

In a class of this embodiment, a temperature for drying for dehydration in the step (4) is 100-200° C. and the time is 4-8 hrs.

Advantages of the invention are summarized below.

The invention provides a modified molecular sieve with high selectivity to ammonia nitrogen in wastewater and a preparation method thereof, in which the modified molecular sieve helps to solve the problem of the large pressure drop caused by using the fixed bed reactor in ammonia-nitrogen wastewater treatment. The modified molecular sieve can remove the ammonia nitrogen in wastewater with high selectivity. The preparation method of the invention is simple, the materials are easily accessible, and the modified molecular sieve can be easily made.

DETAILED DESCRIPTION OF THE EMBODIMENTS

Example 1

Use magnesium nitrate to prepare 2 mol/L of a magnesium salt solution and use phosphoric acid to prepare 2 mol/L of a phosphoric acid solution. Add the molecular sieve MCM-41 into the same volume of the magnesium salt solution, stir for 10 mins, stand for 6 hrs, and then dry for dehydration. Control the temperature of the drying for dehydration to 100° C. for 8 hrs and bake for 6 hrs under the temperature of 500° C. to obtain a modified molecular sieve with supported magnesium compounds. Afterwards, add the modified molecular sieve with supported magnesium compounds into the same volume of the phosphoric acid solution, stir for 20 mins, stand for 1 hr, and then dry for dehydration. Control the temperature of the drying for dehydration to 100° C. for 6 hrs and bake for 4 hrs under the temperature of 400° C. to obtain a modified molecular sieve with supported magnesium and phosphorus compounds, in which the magnesium compound is magnesium oxide and the phosphorus compound is phosphorus pentoxide. The pore diameter of the modified molecular sieve is within 2-5 nm, BET specific surface area is greater than 850 $m^2/g$, a relative crystalline is more than 90%, and Si/Al is greater than 1. The weight percentage contents of magnesium and phosphorus in the modified molecular sieve are both 10%, the ammonia nitrogen in wastewater can be removed with high selectivity and the adsorption capacity to the ammonia nitrogen is 180 mg/g molecular sieve.

Example 2

Use magnesium carbonate to prepare 4 mol/L of a magnesium salt solution and use phosphoric acid to prepare 4 mol/L of a phosphoric acid solution. Add the molecular sieve MCM-41 into the same volume of the magnesium salt solution, stir for 30 mins, stand for 5 hrs, and then dry for dehydration. Control the temperature of the drying for dehydration to 200° C. for 4 hrs and bake for 5 hrs under the temperature of 600° C. to obtain a modified molecular sieve with supported magnesium compounds. Afterwards, add the modified molecular sieve with supported magnesium compounds into the same volume of the phosphoric acid solution, stir for 10 mins, stand for 6 hrs, and then dry for dehydration. Control the temperature of the drying for dehydration to 150° C. for 8 hrs and bake for 3 hrs under the temperature of 500° C. to obtain a modified molecular sieve with supported magnesium and phosphorus compounds, in which the magnesium compound is magnesium carbonate and the phosphorus compound is phosphorus pentoxide. The pore diameter of the modified molecular sieve is within 1.5-6 nm, BET specific surface area is greater than 800 $m^2/g$, a relative crystalline is more than 90%, and Si/Al is greater than 1. The weight percentage contents of magnesium and phosphorus in the modified molecular sieve are both 20%, the ammonia nitrogen in wastewater can be removed with high selectivity and the adsorption capacity to the ammonia nitrogen is 275 mg/g molecular sieve.

Example 3

Use magnesium oxide to prepare 5 mol/L of a magnesium salt solution and use phosphoric acid to prepare 4 mol/L of a phosphoric acid solution. Add the molecular sieve SBA-15 into the same volume of the magnesium salt solution, stir for 20 mins, stand for 3 hrs, and then dry for dehydration. Control the temperature of the drying for dehydration to 150° C. for 6 hrs and bake for 2 hrs under the temperature of 400° C. to obtain a modified molecular sieve with supported magnesium compounds. Afterwards, add the modified molecular sieve with supported magnesium compounds into the same volume of the phosphoric acid solution, stir for 30 mins, stand for 2 hrs, and then dry for dehydration. Control the temperature of the drying for dehydration to 200° C. for 4 hrs and bake for 2 hrs under the temperature of 600° C. to obtain a modified molecular sieve with supported magnesium and phosphorus compounds, in which the magnesium compound is a mixture of magnesium nitrate and magnesium phosphate, and the phosphorus compound is magnesium phosphate. The pore diameter of the modified molecular sieve is within 5-10 nm, BET specific surface area is greater than 600 $m^2/g$, a relative crystalline is more than 90% and Si/Al is greater than 1. The weight percentage contents of magnesium in the modified molecular sieve is 25%, the weight percentage contents of phosphorus in the modified molecular sieve is 20%, the ammonia nitrogen in wastewater can be removed with high selectivity and the adsorption capacity to the ammonia nitrogen is 290 mg/g molecular sieve.

Example 4

Use magnesium nitrate to prepare 3 mol/L of a magnesium salt solution and use phosphoric acid to prepare 3 mol/L of a phosphoric acid solution. Add the molecular sieve SBA-15 into the same volume of the magnesium salt solution, stir for 10 mins, stand for 4 hrs, and then dry for dehydration. Control the temperature of the drying for dehydration to 200° C. for 6 hrs and bake for 3 hrs under the temperature of 300° C. to obtain a modified molecular sieve with supported magnesium compounds. Afterwards, add the modified molecular sieve with supported magnesium compounds into the same volume of the phosphoric acid solution, stir for 30 mins, stand for 5 hrs, and then dry for dehydration. Control the temperature of the drying for dehydration to 200° C. for 8 hrs and bake for 5 hrs under the temperature of 500° C. to obtain a modified molecular sieve with supported magnesium and phosphorus compounds, in which the magnesium compound is magnesium phosphate and the phosphorus compound is a mixture of phosphorus pentoxide and magnesium phosphate. The pore diameter of the modified molecular sieve is within 6-10 nm, BET specific surface area is greater than 650 $m^2/g$, a relative crystalline is more than 90% and Si/Al is greater than 1. The weight percentage contents of magnesium and phosphorus in the modified molecular sieve are both 15%, the ammonia nitrogen in wastewater can be removed with high selectivity and the adsorption capacity to the ammonia nitrogen is 235 mg/g molecular sieve.

Example 5

Use magnesium oxide to prepare 1 mol/L of a magnesium salt solution and use phosphoric acid to prepare 1 mol/L of a phosphoric acid solution. Add the molecular sieve MCM-48 into the same volume of the magnesium salt solution, stir for 20 mins, stand for 1 hr, and dry for dehydration. Control the temperature of the drying for dehydration to 100° C. for 4 hrs and bake for 4 hrs under the temperature of 500° C. to obtain a modified molecular sieve with supported magnesium compounds. Afterwards, add the modified molecular sieve with supported magnesium compounds into the same volume of the phosphoric acid solution, stir for 20 mins, stand for 4 hrs, and then dry for dehydration. Control the temperature of the drying for dehydration to 150° C. for 4 hrs and bake for 2 hrs under the temperature of 300° C. to obtain a modified molecular sieve with supported magnesium and phosphorus compounds, in which the magnesium compound is magnesium carbonate and the phosphorus compound is phosphorus pentoxide. The pore diameter of the modified molecular sieve is within 1.5-5 nm, BET specific surface area is greater than 750 $m^2/g$, a relative crystalline is more than 90%, and Si/Al is greater than 1. The weight percentage contents of magnesium and phosphorus in the modified molecular sieve are both 5%, the ammonia nitrogen in wastewater can be removed with high selectivity and the adsorption capacity to the ammonia nitrogen is 140 mg/g molecular sieve.

Example 6

Use magnesium carbonate to prepare 2 mol/L of a magnesium salt solution and use phosphoric acid to prepare 2 mol/L of a phosphoric acid solution. Add the molecular sieve SBA-3 into the same volume of the magnesium salt solution, stir for 30 mins, stand for 2 hrs, and then dry for dehydration. Control the temperature of the drying for dehydration to 150° C. for 8 hrs and bake for 4 hrs under the temperature of 600° C. to obtain a modified molecular sieve with supported magnesium compounds. Afterwards, add the modified molecular sieve with supported magnesium compounds into the same volume of the phosphoric acid solution, stir for 10 mins, stand for 3 hrs, and then dry for dehydration. Control the temperature of the drying for dehydration to 100° C. for 6 hrs and bake for 6 hrs under the temperature of 400° C. to obtain a modified molecular sieve with supported magnesium and phosphorus compounds, in which the magnesium compound is magnesium oxide and the phosphorus compound is phosphorus pentoxide. The pore diameter of the modified molecular sieve is within 1.5-4 nm, BET specific surface area is greater than 1000 $m^2/g$, a relative crystalline is more than 90%, and Si/Al is greater than 1. The weight percentage contents of magnesium and phosphorus in the modified molecular sieve are both 10%, the ammonia nitrogen in wastewater can be removed with high selectivity and the adsorption capacity to the ammonia nitrogen is 190 mg/g molecular sieve.

The invention claimed is:

1. A method of preparation of a molecular sieve having high selectivity to ammonia nitrogen in wastewater, the method comprising the following steps:
   a) dissolving a magnesium salt into water to obtain 1-5 mol/L of a magnesium salt solution;
   b) dissolving phosphoric acid into water to obtain 1-4 mol/L of a phosphoric acid solution;
   c) adding a molecular sieve into the magnesium salt solution prepared in the step a), stirring for 10-30 minutes, standing for 1-6 hours, drying for dehydration, and baking for 2-6 hours under a temperature of 300-600° C.; wherein the molecular sieve has a pore diameter of between 1.5 and 10 nm, a BET specific surface area of greater than 600 $m^2/g$, a degree of crystallinity of more than 90%, and a silica to alumina ratio of greater than 1; and
   d) adding a molecular sieve with supported magnesium compounds obtained from the step c) into the phosphoric acid solution prepared in the step b), stirring for 10-30 minutes, standing for 1-6 hours, drying for dehydration, and baking for 2-6 hours under a temperature of 300-600° C. to obtain the molecular sieve having high selectivity to ammonia nitrogen in wastewater.

2. The method of claim 1, wherein the magnesium salt used in the step a) is magnesium nitrate, magnesium carbonate, or a mixture thereof.

3. The method of claim 1, wherein a temperature for drying for dehydration in the step c) is 100-200° C. and the time is 4-8 hours.

4. The method of claim 2, wherein a temperature for drying for dehydration in the step c) is 100-200° C. and the time is 4-8 hours.

5. The method of claim 1, wherein a temperature for drying for dehydration in the step d) is 100-200° C. and the time is 4-8 hours.

6. The method of claim 2, wherein a temperature for drying for dehydration in the step d) is 100-200° C. and the time is 4-8 hours.

7. The method of claim 1, wherein the molecular sieve used in step c) is MCM-41, MCM-48, SBA-15, or SBA-3.

8. The method of claim 1, wherein the molecular sieve obtained in d) has an adsorption capacity to the ammonia nitrogen of between 140 mg and 290 mg per gram of said molecular sieve.

* * * * *